US011976881B2

(12) United States Patent
Floan et al.

(10) Patent No.: US 11,976,881 B2
(45) Date of Patent: May 7, 2024

(54) DESOLVENTIZER TOASTER WITH CONVECTIVE CURRENT RECYCLE

(71) Applicant: Crown Iron Works Company, Blaine, MN (US)

(72) Inventors: Benjamin Wayne Floan, Andover, MN (US); George E. Anderson, Champlin, MN (US); Paul William Gallagher, Hull (GB)

(73) Assignee: CROWN IRON WORKS COMPANY, Blaine, MN (US)

( * ) Notice: Subject to any disclaimer, the term of this patent is extended or adjusted under 35 U.S.C. 154(b) by 779 days.

(21) Appl. No.: 17/057,798

(22) PCT Filed: May 23, 2019

(86) PCT No.: PCT/US2019/033833
§ 371 (c)(1),
(2) Date: Nov. 23, 2020

(87) PCT Pub. No.: WO2019/226943
PCT Pub. Date: Nov. 28, 2019

(65) Prior Publication Data
US 2021/0199379 A1    Jul. 1, 2021

Related U.S. Application Data

(60) Provisional application No. 62/675,510, filed on May 23, 2018.

(51) Int. Cl.
*F26B 21/02* (2006.01)
*F26B 9/08* (2006.01)
*F26B 21/10* (2006.01)

(52) U.S. Cl.
CPC .............. *F26B 21/02* (2013.01); *F26B 21/10* (2013.01); *F26B 9/082* (2013.01)

(58) Field of Classification Search
None
See application file for complete search history.

(56) References Cited

U.S. PATENT DOCUMENTS

| 2,776,894 A | 1/1957 | Kruse | |
| 3,126,285 A * | 3/1964 | Lippold | B01J 8/125 34/423 |

(Continued)

FOREIGN PATENT DOCUMENTS

EP    1336426 A1    8/2003

OTHER PUBLICATIONS

Extended European Search Report for European Application No. EP19806870.2, dated Jan. 31, 2022, 7 pgs.

(Continued)

*Primary Examiner* — David J Laux
(74) *Attorney, Agent, or Firm* — Fredrikson & Byron, P.A.

(57) ABSTRACT

A desolventizer for processing solvent-wet solid material may include a thermal recirculation loop to increase thermal performance. In some examples, the desolventizer includes a housing, an ejector, and a vent. The housing contains a first tray and a second tray vertically elevated above the first tray to define a processing space. The ejector has an inlet located between the first tray and the second tray and an outlet also located between the first tray and the second tray. The vent has an inlet located between the first tray and the second tray. In operation, the ejector can draw gas from the processing space via the inlet and discharge the gas through the outlet back into the processing space, creating a recirculation loop.

9 Claims, 6 Drawing Sheets

(56) References Cited

U.S. PATENT DOCUMENTS

| | | | | |
|---|---|---|---|---|
| 6,279,250 B1* | 8/2001 | Anderson | ............ | F26B 23/002 |
| | | | | 34/573 |
| 2002/0066663 A1* | 6/2002 | Anderson | ............ | F26B 17/003 |
| | | | | 202/175 |
| 2012/0066929 A1* | 3/2012 | Kemper | ................. | A23L 5/21 |
| | | | | 34/498 |
| 2012/0266489 A1* | 10/2012 | Anderson | ............ | F26B 17/003 |
| | | | | 34/588 |
| 2014/0115914 A1* | 5/2014 | Anderson | ............ | F26B 25/006 |
| | | | | 34/168 |

OTHER PUBLICATIONS

International Search Report and Written Opinion of the ISA/US in PCT/US2019/033833, dated Aug. 12, 2019, 10 pgs.

* cited by examiner

DESOLVENTIZER TOASTER WITH CONVECTIVE CURRENT RECYCLE

RELATED APPLICATIONS

This application is a 35 U.S.C. 371 national stage filing from International Application No. PCT/US2019/033833, filed May 23, 2019, which claims the benefit of U.S. Patent Application No. 62/675,510, filed May 23, 2018 The entire contents of both of these applications are incorporated herein by reference.

TECHNICAL FIELD

This disclosure relates to desolventizing and, more particularly, to desolventizing material after having undergone a solvent extraction process.

BACKGROUND

A variety of different industries use extractors to extract and recover substances entrained within solids. For example, producers of products from renewable organic sources use extractors to extract carbohydrates and/or oil from solid matter, such as soybeans, rapeseed, sunflower seed, peanuts, cottonseed, palm kernels, and corn germ. The matter is contacted with a solvent within the extractor, causing the desired product to be extracted from a surrounding cellular structure into the solvent. As another example, extractors are used to recover asphalt from shingles and other petroleum-based waste materials. Typically, the petroleum-based material is ground into small particles and then passed through an extractor to extract the asphalt from the solid material into a surrounding organic solvent.

After the matter is processed through the extractor, the residual solvent-wet solid material is desolventized. Desolventizing vaporizes solvent from the solid material, allowing the solvent to be recovered for reuse in the extraction process as well as drying the solid material for downstream use or disposal. In practice, the amount of solvent removed from the solvent-wet solid material during desolventizing can vary based on a variety of factors, such as the density and solvent loading of the material, the processing time and conditions within a desolventizing apparatus, and the efficiency of the desolventizing apparatus. If the desolventizing efficiency of the desolventizing apparatus is not sufficient for the operating environment, for example because of increased throughput or changes in the characteristics of the solvent-wet solid material, the material may not be sufficiently desolventized for downstream use.

SUMMARY

In general, this disclosure is directed to devices, systems, and techniques for desolventizing solvent wet solid material. The solvent wet solid material may be desolventized using a desolventizer configured to generate forced convective currents for increasing heat transfer to the material being desolventized. In some examples, the desolventizer includes multiple vertically stacked trays. The solvent wet solid material being processed can enter at the top of the desolventizer and flow vertically downwards from tray to tray before being discharged from the bottom of the desolventizer. Each tray may have a moving or rotating arm that sweeps the solvent wet solid material toward a discharge opening on the tray. The tray may be heated and/or a heat transfer medium (e.g., steam, hot air) may be introduced into the processing space to heat the solvent wet material and vaporize solvent from the material while being processed on the tray.

In some configurations according to the present disclosure, the desolventizer includes a thermal recirculation loop that recirculates gas within a processing space between two trays of the desolventizer. The recirculation loop may draw gas within the processing space from a location below the top surface of the bed of solvent wet solid material and inject the gas back into the processing space above the top surface of the bed. For example, the desolventizer may include an ejector that draws gas through an opening below the top surface of the bed of solid material being processed on the tray, pressurizes the gas via injection of a motive gas stream, and injects the pressurized gas back above the top surface of the bed of material. As a result, a thermal recirculation loop is created where hot gas is forced through the bed of material being processed from the top toward the bottom of the bed. This can increase the thermal contact and heat transfer between the hot gas in the processing space and the solvent wet solid material being processed.

To help control the pressure within the processing space about which gas is recycled, the desolventizer toaster may include a vent in fluid communication with the processing space. As gas is withdrawn from the processing space and reinjected into the space with the aid of a motive gas, the operating pressure within the space may build over time unless vented. Accordingly, a pressure regulated vent may be provided to limit the pressure within the processing space to a target threshold pressure. Additionally or alternatively, the discharge ports of the trays bounding the processing space may be sealed to substantially pressure isolate the processing space from adjacent processing spaces.

A desolventizer according to disclosure can have a variety of different features and configurations. For example, the desolventizer may have only a single thermal recirculation loop for a single stage of desolventizing or may have multiple thermal recirculation loops, one for each of multiple processing stages. As another example, independent pressure control of multiple processing stages of the desolventizer may allow different stages (processing spaces) of the desolventizer to operate at different pressures. For example, the desolventizer may operate at a comparatively low pressure at the top of the desolventizer, a comparatively high pressure at the bottom of the desolventizer, and progressively increasing pressures between the top and the bottom of the desolventizer.

As another example, the desolventizer may operate with some processing spaces functioning as desolventizing stages and other (e.g., lower) processing spaces functioning as drying stages. When so configured, the desolventizer may operate with an asymmetrical pressure profile across its height whereby an uppermost stage is at a comparatively high pressure and a lower stage is at a comparatively low pressure, collectively defining the desolventizing section. Below the desolventizing section, there may be at least one stage that operates at a higher pressure than the low pressure desolventizing stage, and a lower stage that operates at a lower pressure than the high pressure stage, collectively defining the drying section.

A desolventizer with thermal recirculation loop can have a variety of advantages as compared to a comparable desolventizer without a thermal recirculation loop. For example, the desolventizer with thermal recirculation loop may dry the solvent wet solid material more thoroughly (e.g., to a lower residual solvent concentration at the discharge of the desolventizer) than a comparative desolventizer without thermal recirculation loop. Additionally or alternatively, a desolventizer with thermal recirculation loop may desolventize the solvent wet solid material more efficiently than a comparative desolventizer without thermal recirculation loop, reducing the energy requirements (e.g., steam consumption) needed to dry the material. The efficiency improvements and pressure control flexibility offered by a desolventizer in accordance with the disclosure can provide operators with new operational flexibility and performance characteristics over prior desolventizer designs.

In one example, a desolventizer-toaster (DT) system is described that includes a housing, an ejector, and a vent. The housing contains a first tray and a second tray vertically elevated above the first tray to define a processing space therebetween. The first and second trays may be the uppermost two trays or any other pair of adjacent trays in the housing. The ejector has an inlet located between the first tray and the second tray and an outlet also located between the first tray and the second tray. The vent has an inlet located between the first tray and the second tray.

In another example, a desolventizer-toaster (DT) system is described that includes a housing containing a plurality of trays vertically spaced from one another to define a plurality of processing zones. Each of the processing zones is configured to indirectly and/or directly heat a solvent-containing material being processed to vaporize solvent from the solvent-containing material. The example specifies that one or more of the processing zones have a baffle and a recirculation loop. The baffle divides the processing zone into an annular space formed between the baffle and an inner wall of the housing and a second space on an opposite side of the baffle. The recirculation loop has an ejector supplies with a motive gas. The recirculation loop with ejector is arranged to draw gas from the annular space and reinject the gas into the second space.

In another example, a method is described that includes introducing a solvent-containing material into a housing containing a plurality of trays vertically spaced from one another to define a plurality of processing zones. The method includes heating the solvent-containing material in at least some of the plurality of processing zones through application of indirect and/or direct heating and thereby vaporizing solvent from the solvent-containing material. The method further includes drawing gas from an annular space formed between a baffle and an inner wall of the housing within a select one of the plurality of processing zones. The method also includes pressurizing the gas drawn from the annular space using a motive gas passed through an ejector to form a pressurized gas containing both motive gas and gas drawn from the annular space. The pressurized gas is reinjected into the processing space, such as into a second space positioned on an opposite side of the baffle from the annular space. As a result, a forced convective current recirculation loop may be provided whereby gas is drawn through a bed of solvent-containing material and from the annular space, pressurized with a motive gas, and reinjected above the bed of material being processed.

The details of one or more examples are set forth in the accompanying drawings and the description below. Other features, objects, and advantages will be apparent from the description and drawings, and from the claims.

DETAILED DESCRIPTION

This disclosure generally relates to desolventizer systems and techniques, such as desolventizers used downstream of a solid-liquid or liquid-liquid extraction device to reduce the solvent content of solvent wet solids produced by the extraction device. The desolventizer may have multiple trays that the solvent wet solids material contacts in series as it flows through the desolventizer. Each tray may define a desolventization stage and create a processing space between adjacent trays. The processing space may be substantially pressure isolated from adjacent spaces, for example, by including a pressure regulation device (e.g., rotary valve) between adjacent trays. At least one of the processing spaces of the desolventizer may be configured with a thermal recirculation loop.

For example, the processing space may have an outlet opening above the tray deck for drawing gas out of the processing space. The outlet opening may be positioned such that, in operation, a height of material on the tray being dried is above the outlet opening. The processing space may also have an inlet opening above the height of the material on the tray being dried, optionally separated from the outlet opening by a baffle. An ejector may be located in the fluid pathway between the outlet opening and the inlet opening. In operation, a motive gas such as steam may be supplied to the ejector, generating a vacuum pressure at the outlet opening and discharging a positively pressured gas (combination of drawn gas from the processing space and motive gas) back into the processing space. As a result, a flow of gas can be established whereby gas is drawn through at least a portion of the bed of material being dried on the tray, pressurized with motive gas, and reintroduced above the bed of material being dried within the processing space. Incoming material to be dried can fall downwardly under a force of gravity through the processing space, during which the falling material may or more not contact and interact with the gas stream. The resulting recirculating loop can increase thermal transfer between the gas and the material to be dried, more efficiently drying the material and/or removing a greater amount of solvent that if the desolventizer did not include such a recirculation loop.

Figure 1:
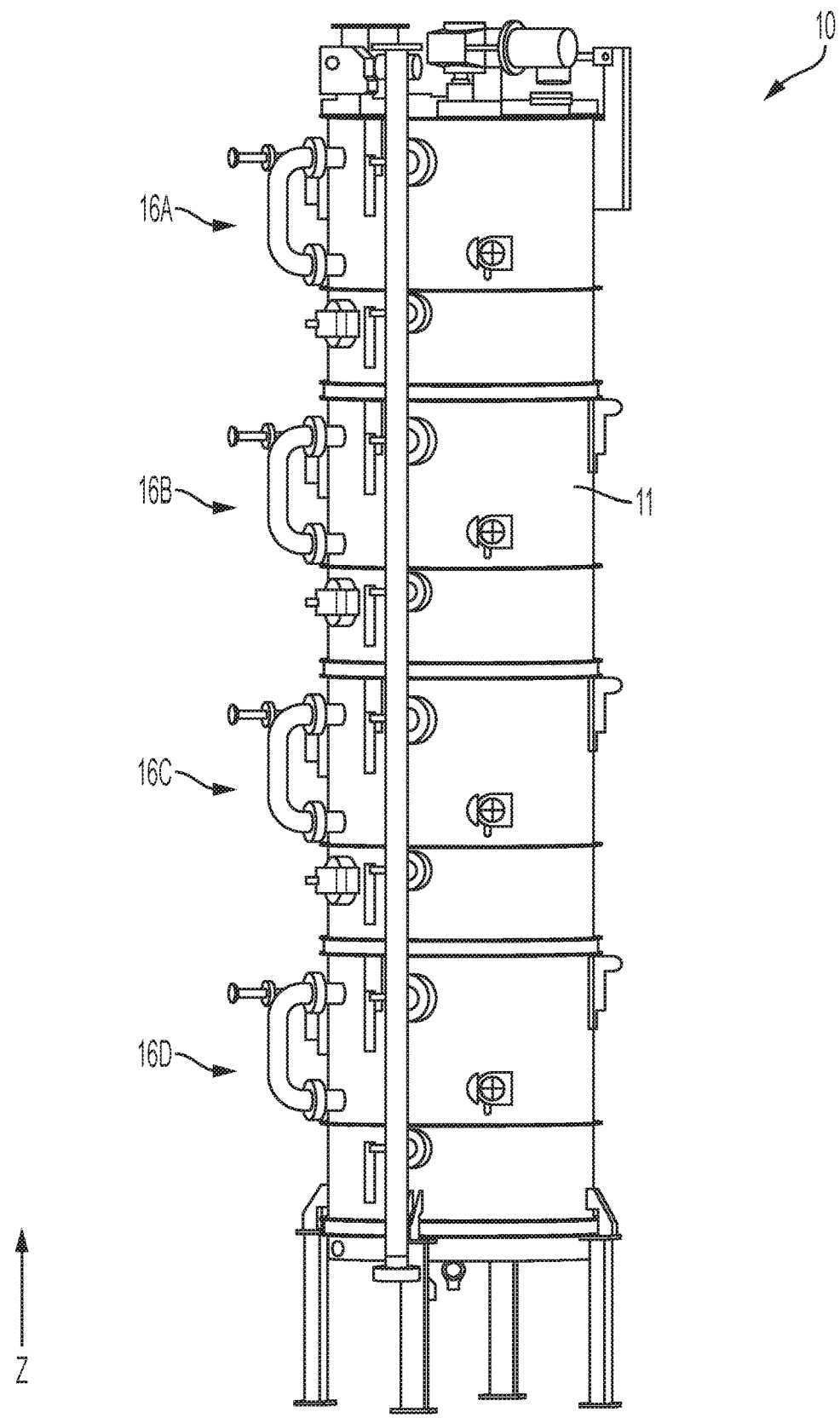
FIGS. 1 and 2 are perspective and side sectional views, respectively, of an example desolventizer-toaster (DT) system.
Figure 2:
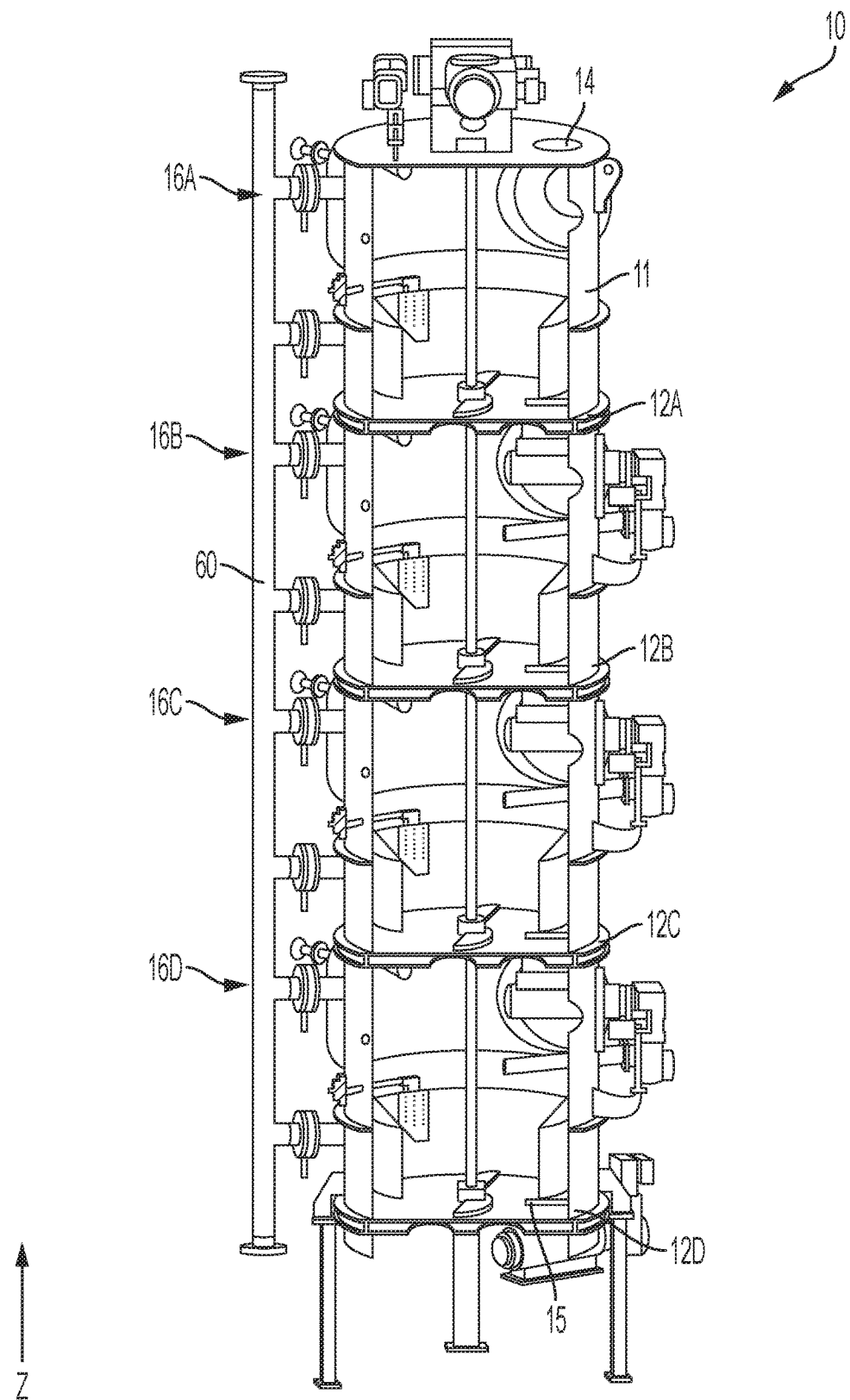

FIGS. 1 and 2 are perspective and side sectional views, respectively, of an example desolventizer-toaster (DT) system 10. Desolventizer-toaster (DT) system 10 is operable to remove solvent from solvent-containing solid material introduced into the system. Desolventizer-toaster (DT) system 10 may or may not further "toast" or brown the outside surface of the solid material being processed, e.g., resulting in denaturing of protein present in the material being processed. Accordingly, it should be appreciated that the characterization of system 10 as a desolventizer-toaster is representative of example ranges of solvent removal and drying that may be achieved in different implementations of the concepts described herein but is not intended to be limiting or require a specific degree of solvent removal or drying to be achieved. Accordingly, desolventizer-toaster (DT) system 10 is also referred to as "desolventizer 10."

In the example of FIGS. 1 and 2, desolventizer 10 is illustrated as including a vessel housing 11 that contains a plurality of trays 12A-12D (referred to as "tray 12"). The trays 12 are arranged vertically relative to each other in a stacked arrangement with respect to gravity. That is, first tray 12A is positioned vertically above second tray 12B which, in turn, is positioned vertically above third tray 12C, finally, fourth tray 12D. While the illustrated example desolventizer has four trays, the desolventizer may be designed with fewer trays (e.g., two or three trays), or more trays (e.g., six, seven, or more) and the disclosure is not limited in this respect.

Desolventizer vessel housing 11 includes an inlet opening 14 and an outlet opening 15. In operation, material to be dried enters the housing of desolventizer 10 via inlet opening 14 and flows vertically downward through the desolventizer before exiting through outlet 15. As the material to be dried flows through the desolventizer, the material may flow over each of the respective trays in the desolventizer. The material may or may not physically contact the top surface of each of the trays, depending on whether the material flows on top of underlying material as it passes over a particular tray. Each tray 12 can have one or more outlet openings that allows material to flow through the tray and down to an underlying tray or outlet 16 (e.g., after a desired of residence time on a particular tray).

In general, any type of wetted solid material may be processed using desolventizer 10. Example types of solid material that can be processed using desolventizer 10 include, but are not limited to, oleaginous matter, such as soybeans (and/or soy protein concentrate), rapeseed, sunflower seed, peanuts, cottonseed, palm kernels, and corn germ; oil-bearing seeds and fruits; asphalt-containing materials (e.g., asphalt-containing roofing shingles that include an aggregate material such as crushed mineral rock, asphalt, and a fiber reinforcing); stimulants (e.g., nicotine, caffeine); alfalfa; almond hulls; anchovy meals; bark; coffee beans and/or grounds, carrots; chicken parts; chlorophyll; diatomic pellets; fish meal; hops; oats; pine needles; tar sands; vanilla; and wood chips and/or pulp. Such materials may be wetted with an aqueous, organic, and/or inorganic liquid. Typical types of liquids that may be wetting the solid material being processed on desolventizer 10 include, but are not limited to a hydrocarbon (e.g., acetone, hexane, toluene), alcohol (e.g., isopropyl alcohol, ethanol, other alcohols), and water.

While a desolventizer according to the disclosure can process any desired types of materials to remove solvent from the materials, in some applications, the desolventizer is used to desolventize comparatively low density materials. Such comparatively low density materials, like palm kernels, can be challenging to desolventize down to a sufficiently low solvent content using traditional desolventizer apparatuses. In some examples according to the disclosure, the solvent-containing material being processed has a density ranging from 10 pounds per cubic foot (lbs/ft$^3$) to 20 lbs/ft$^3$, with the density of the material changing during the drying and desolventization process. For example, incoming solvent-containing material may have a density from 15 lbs/ft$^3$ to 18 lbs/ft$^3$, while desolventized material discharging from the desolventizer may have a density ranging from 10 lbs/ft$^3$ to 14 lbs/ft$^3$. Materials having other densities can be processed on desolventizer 10. For instance, in other examples, the incoming material being processed may have a density ranging from 10 lbs/ft$^3$ to 50 lbs/ft$^3$, such as from 25 lbs/ft$^3$ to 45 lbs/ft$^3$. As one specific example, solvent-wetted soybean meal may typically have a density ranging from 30 lbs/ft$^3$ to 40 lbs/ft$^3$.

In practice, desolventizer 10 may be utilized as part of an extraction system that receives wetted solid from an upstream extraction device. The extractor may be an immersion extractor, a percolation extractor, or yet other type of extraction device. Within the extraction device, material to be processed is contacted with a solvent, e.g., in continuous or batch mode. For example, the extraction device may be a countercurrent extractor in which solid material to be processed is introduced at one end and conveyed to an opposite end of the extractor while an extraction solvent is introduced into the extractor at an opposite end and flows towards the end where the solid material enters. As the solvent travels through the extractor from the inlet to the outlet, the solvent can flow in a countercurrent direction to the flow of solid material passing through the extractor. The solvent intermixes with the solid material within extractor, causing the extract carried by the solid material to transfer from the solid material to the solvent. Accordingly, in operation, solvent having a comparatively low concentration of extract enters at an inlet while solvent having an increased concentration of extract discharges at an outlet. Likewise, fresh solid material carrying extract enters at an inlet of the extractor while residual solid material having a reduced concentration of extract is discharged at an outlet of the extractor. It is this solid material that is wetted with solvent from the extractor that may be conveyed to desolventizer 10 for drying.

Independent of the source of the material being processed on desolventizer 10, the desolventizer may heat and dry (by vaporizing solvent) the solvent wet material introduced into the device. A variety of different sources of direct and/or indirect heating may be used to supply thermal energy to the solid material being dried. For example, one or more (e.g., all) of trays 12 may provide indirect heating to the solid material being processed. Each such tray may have openings across its thickness that allows a thermal transfer fluid (e.g., steam) to pass through the tray and heat the tray without causing the thermal transfer fluid to enter into the space the solid material being dried flows through. Additionally or alternatively, one or more of trays 12 may provide direct heating, e.g., by having a steam sparge that injects steam up through the tray into the material being processed. The sidewalls of the vessel housing 11 may or may not be heated.

For example, different trays of desolventizer 10 may be heated differently depending on their position within the desolventizer. The uppermost tray or trays (e.g., top two or three trays depending on vessel size) may be predesolventizing tray(s). These tray(s) may use indirect heat to flash vaporize solvent from the solvent wet solid material as the solvent wet solid material contacts the hot tray surface. However, the predesolventizing tray(s) may not have a direct heat source (e.g., steam sparge) to avoid adding additional moisture into the solvent wet solid material being processed in these trays.

The main or middle trays (e.g., middle-most one, two, three, four, or five trays depending on vessel size) may provide both indirect heating and direct steam contact to remove the bulk of the solvent from the solvent wet solid. This can also add moisture to the solvent wet solid, e.g., where is desired to steam cook the material, such as when processing residual solid from an oilseed feedstock. In different configurations, direct steam contact may be provided by having a steam distribution manifold under a tray and allowing steam to percolate up through the tray and/or by injecting steam as a mode of gas source above the tray. For example, some configurations of desolventizer 10 include middle trays that are indirectly heated but do not have a direct heat source adding thermal energy under or through the tray. Rather, in these examples, direct heat (if optionally desired) may be supplied as a motive gas source that drives a recirculation loop of thermal energy in the space above the tray.

The lowermost tray or trays (e.g., bottom two or three trays depending on vessel size) may be a sparge tray. The sparging tray may be perforated for directs barge steam injection, which can strip the final residual solvent from the solid material being processed and vent upwardly through desolventizer 10. In other configurations, however, the lowermost tray or trays may not be sparge trays. For example, the lowermost tray or trays may provide indirect heating without any direct heat injection, or may even be unheated and/or cooled trays to cool the solid material before being discharged from desolventizer 10.

As the foregoing discussion illustrates, desolventizer 10 may be configured with a variety of different direct and/or indirect heating arrangements. In one specific example, none of the trays 12 in desolventizer 10 are configured with direct heating (e.g., such that steam passes through the tray into the material being processed). In another specific example, only the lowermost tray (e.g., fourth tray 12D in FIG. 2) is configured for direct heating as a steam sparge tray and none of the other trays are configured for direct heating. Rather, in these two examples, the trays may only be indirect heating trays (or, optionally, unheated or cooled trays, depending on their position within the desolventizer).

As noted above, at least one of the processing spaces between adjacent trays may include a thermal recirculation loop. In the example, of FIGS. 1 and 2, each of the processing spaces above the lowermost tray 12D includes a recirculation loop 16A-16C (referred to as "recirculation loop 16"). Recirculation loop 16 may draw recirculate gas in the processing space bounded between two trays (and/or a tray in an upper ceiling surface or lower bottom wall surface of housing 11). For example, with reference to FIG. 2, recirculation loop 16B is illustrated as providing a recirculation that for the processing space between first tray 12A and second tray 12B. The recirculation loop can draw gas through an outlet located at a vertically lower position along housing 11 within the processing space and inject the gas back into the same processing space through an inlet located at a vertically higher position along housing 11 within the processing space.

Figure 3:
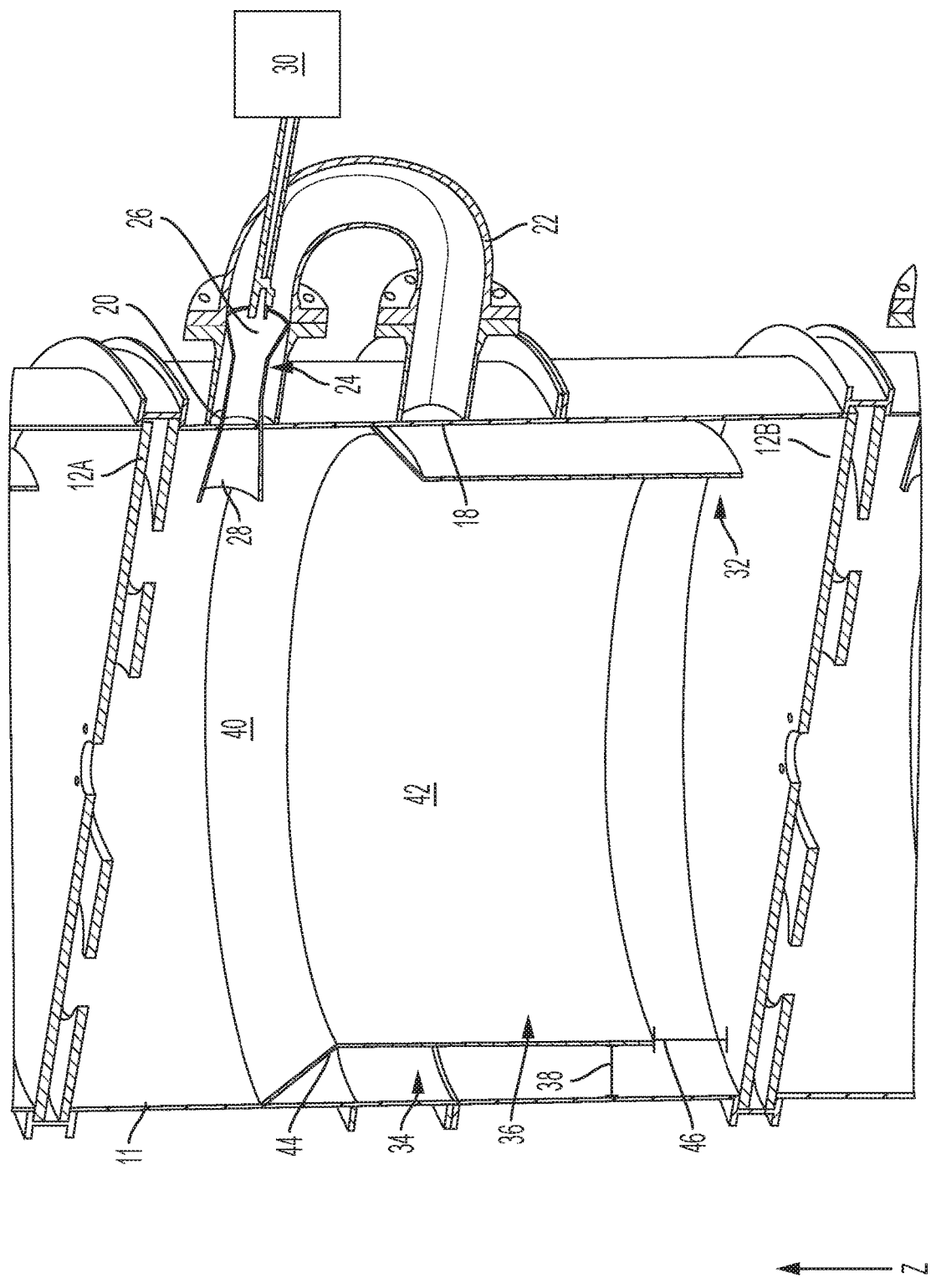
FIG. 3 is a sectional side view of a portion of the example desolventizer of FIGS. 1 and 2 illustrating an example arrangement of a recirculation loop.

FIG. 3 is a sectional side view of a portion of desolventizer 10 (shown with certain optional features removed for purposes of illustration) illustrating an example arrangement of a recirculation loop. As shown in this example, housing 11 defines an inlet opening 18 and an outlet opening 20 joined together by a section of piping 22 to provide the recirculation loop 16. Recirculation loop 16 includes a gas conveyance device 24. In operation, gas is drawn from the processing space between the trays 12 through inlet opening 18 and into piping 22. Gas conveyance device 24 can provide a motive force pressurizing the gas and/or create a vacuum that draws the gas into piping 24 and introduced the pressurized gas back into the processing space between the trays. In different examples, gas conveyance device may be implemented as a fan, a vacuum pump, or an ejector.

In the specific example illustrated, piping 22 is shown implemented as a U- or C-shaped section of pipe extending from inlet 18 to outlet 20. Ejector 24 is positioned at the outlet end 20 of piping 22 and includes a converging nozzle 26 inside of piping 20 and a diverging nozzle 28 projecting from the piping inside of the processing space between trays 12. A motive gas source 30 may be connected to ejector 24 (e.g., each ejector in system 10 where there are multiple ejectors) to provide a driving force for drawing gas from the processing space and injecting it back into the processing space. Example motive gases include steam, air (e.g., heated air), and/or inert gas (e.g., heated inert gas).

To help prevent recirculation loop 16 from drawing gas from the processing space between trays 12 that was just injected the via outlet 20 (e.g., without passing through the bed of material on the tray), desolventizer 10 may include a baffle 32. Baffle 32 may be a divider that separates inlet 18 from outlet 20. For example, baffle 32 may be a wall that divides the processing zone between trays 12 into a space 34 on one side of the wall from which gas is drawn and second space 36 on an opposite side of the wall where gas is reintroduced. For example, in FIG. 3, baffle 32 is spaced a distance 38 from the wall defining housing 11. Inlet 18 extends through the housing 11 on an opposite side of the space 34 from the baffle. That is, space 34 separates baffle 32 from the opening in the wall of housing 11 through which recirculation loop 16 draws gas.

Baffle 32 may be implemented as a single divider wall, e.g., extending horizontally or vertically across the cross-sectional area of the processing space. In the example of FIG. 3, however, baffle 32 is illustrated as having a top wall 40 and a sidewall 42 the top wall is connected to and extends from an inner surface of housing 11. Sidewall 42 is connected to top wall 40 and extends downwardly from the top wall. For example, can define a bottom edge 44 from which sidewall 42 extends. Top wall 40 is illustrated as extending outwardly and downwardly from housing 11. This may be useful to provide a slope surface for facilitating downward flow of solid material being processed. However, in other configurations, where baffle includes a top wall 40 the top wall need not be sloped. Further, in other configurations, baffle 32 may be implemented with a sidewall structure without top wall 40 or using yet other configurations.

In general, baffle 32 may function to divide the processing space between trays 12 into two gas spaces: one gas space 34 where gas is drawn into recirculation loop 16, and another gas space 36 where gas is injected from recirculation loop 16 back into the processing space between adjacent trays. To allow gas to flow from the space 36 in which it is injected into space 34 where can be drawn back out, a gap may be provided in the baffle. The gap may be positioned such that, when desolventizer 10 is operating and solid material being processed is present on tray 12, the level of solid material is above the top of the gap. In other words, the solid material may close the gap, requiring gas to flow through the bed of solid material as part of the recirculation loop. Accordingly, inlet 18 of recirculation loop 16 may be positioned on one side of the baffle while outlet 20 of the recirculation loop is positioned on an opposite side of the baffle.

In FIG. 3, baffle 32 extends downwardly from top wall 40 but terminates short of the tray 12 (tray 12B in the figure). This creates a gap or space 46. Solid material being processed may or may not form a bed of greater height during operation than the height of space 46. In some examples, a distance from the bottom edge of baffle 32 (e.g., a bottom edge of sidewall 42) to the top surface of tray 12 ranges from 1 inch to 18 inches, such as from 2 inches to 15 inches, or from 4 inches to 12 inches. The distance 38 separating the inner surface of housing 11 from the inner surface of baffle 32 (sidewall 42) may range from 3 inches to 1 foot, although other dimensions can be used based on the size and capacity of the desolventizer.

In general, the size of gap 46 and/or the distance from the bottom edge of baffle 32 to the top surface of tray 12 may be varied to adjust the velocity of gas being recirculated through the desolventizer stage via the recirculation loop. In some examples, the dimensions may be sized based on the expected feedstock and operating parameters to achieve a gas velocity less than 5 ft/s through the bed of material, such as a gas velocity less than 2 ft/s, or a gas velocity less than 1 ft/s. For example, the velocity of the convective current gas moving through the bed of material on the top surface of tray 12 may range from 0.1 ft/s to 1 ft/s, such as from 0.3 ft/s to 0.8 ft/s.

In the sectional illustration of FIG. 3, baffle 32 is shown extending about an entire perimeter of housing 11 (e.g., 360° in applications where the housing is circular in cross-sectional shape). Accordingly, recirculation loop 16 can draw from this entire perimeter space bounded by baffle 32 through inlet 18 for recirculating gas. In other configurations, however, baffle may not extend about an entire perimeter of desolventizer housing 11 but may instead extend about a lesser portion of the housing. For example, baffle may extend over a perimeter arc ranging from 20° to 270°, such as from 45° to 90°, or from 90° to 180°. Baffles of other size may be used in the disclosure is not limited in this respect.

Baffle 32 may be made of a solid sheet(s) of material (e.g., metal) that is substantially non-porous. Accordingly, baffle 32 may prevent gas communication between annular space 34 and internal space 36 (also referred to as second space 36) except through gap 46 between the bottom of the baffle in the top of the tray surface. In operation, the bottom edge of baffle 32 (e.g., a bottom edge of sidewall 42) may typically extend into the bed of material being processed on the top surface of tray 12. As a result, the bed of material on tray 12 may have height (measured from the top of the tray) greater than the size of gap 46, causing the material to extend up along sidewall 42 a distance from the terminal edge of the sidewall. The material may extend up into both the annular space 34 and inner space 36 (e.g., contacting both sides of sidewall 42), requiring the recirculating gas to flow through the bed of material to cross from inner space 36 to the annular space 34. In some examples, sidewall 42 extends into the bed of material being processed a distance ranging from 4 inches to 3 feet, such as from 1 foot to 2 feet.

Figure 5:
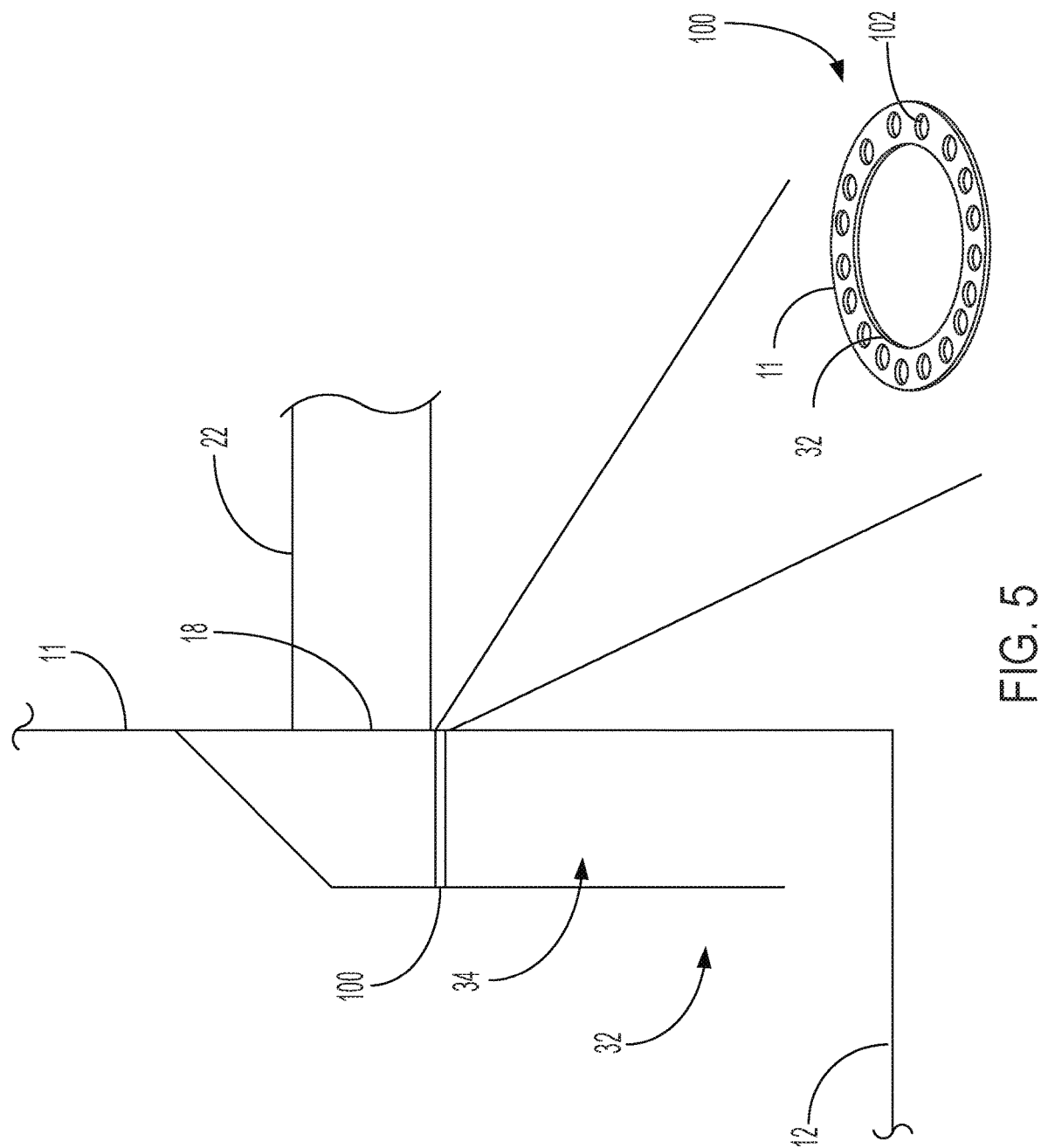
FIG. 5 is a side view of a portion of the example desolventizer of FIGS. 1 and 2 showing an example pressure distributor.

In some examples as illustrated in FIG. 3, inlet opening 18 freely communicates with annular space 34 without an intervening flow restriction structure positioned between the inlet opening and annular space. In other examples, a flow restriction and/or pressure distribution structure may be positioned between inlet opening 18 and the bottom of annular space 34. FIG. 5 is a side view of a portion of desolventizer 10 showing an example pressure distributor 100. Pressure distributor 100 may be implemented using an orifice plate or other apertured structure extending between baffle 32 and housing 11, e.g., adjacent inlet opening 18. Pressure distributor 100 may have a plurality of openings 102 spaced about the perimeter of the structure, which may limit the flow area through which gas can pass up through annular space 34 and into inlet opening 18. This may restrict the velocity and/or pressure, which may be useful to help limit entrainment of solid material being processed in the gas stream. In some configurations, the size and/or configuration of openings 102 is effective to limit the gas velocity within annular space 34 (as measured at the top of the material being processed) to less than 3 ft/s, such as less than 2.5 ft/2, or less than 2 ft/s.

With further reference to FIG. 3, to help prevent recirculation loop 16 from drawing solid material being processed into inlet opening 18, the inlet opening may be positioned near the top of the annular space 34 created by baffle 32. In practice, the bed of solid material being processed on the top of tray 12 may also distribute up into the space 34 created by baffle 32 (e.g., until the level of solid material inside of the space divided by the baffle is at substantially the same height as the level of material outside of the baffle). Accordingly, positioning inlet opening 18 above the expected operating height of the bed of solid material being processed can be useful to help prevent drawing the material into the recirculation. In some examples, inlet opening 18 is positioned in the upper half of the space 34 created by baffle 32 (in the Z-direction on FIG. 3), such as the uppermost quarter, or upper fifth of the space.

In the illustrated configuration of FIG. 3, inlet 18 and outlet 20 of recirculation loop 16 are illustrated as being radially aligned, e.g., such that piping 22 extends upwardly from the inlet to the outlet but does not traverse radially around the perimeter. In other configurations, inlet 18 and outlet 20 of recirculation loop 16 are radially offset from each other. For example, outlet 20 may be positioned at both a vertically elevated location relative to inlet 18 and offset about the perimeter (e.g., in the X-Y plane) of housing 11 relative to the inlet. When so configured, gas reintroduced into the processing space via outlet 20 of the recirculation loop may enter on a different side of housing 11 and at a different elevation in the housing than the location from where the gas being recirculated was drawn via inlet 18. This can be useful to increase the size of the recirculation loop, e.g., by requiring the gas being recirculated to travel both vertically through the bed of material being processed as well as crosswise across at least a portion of the processing space and/or that of material located in the processing space. In some configurations, outlet 20 of recirculation loop 16 is offset at least 25° from inlet 18, such as from 30° to 180°, or from 90° to 180°.

Figure 4:
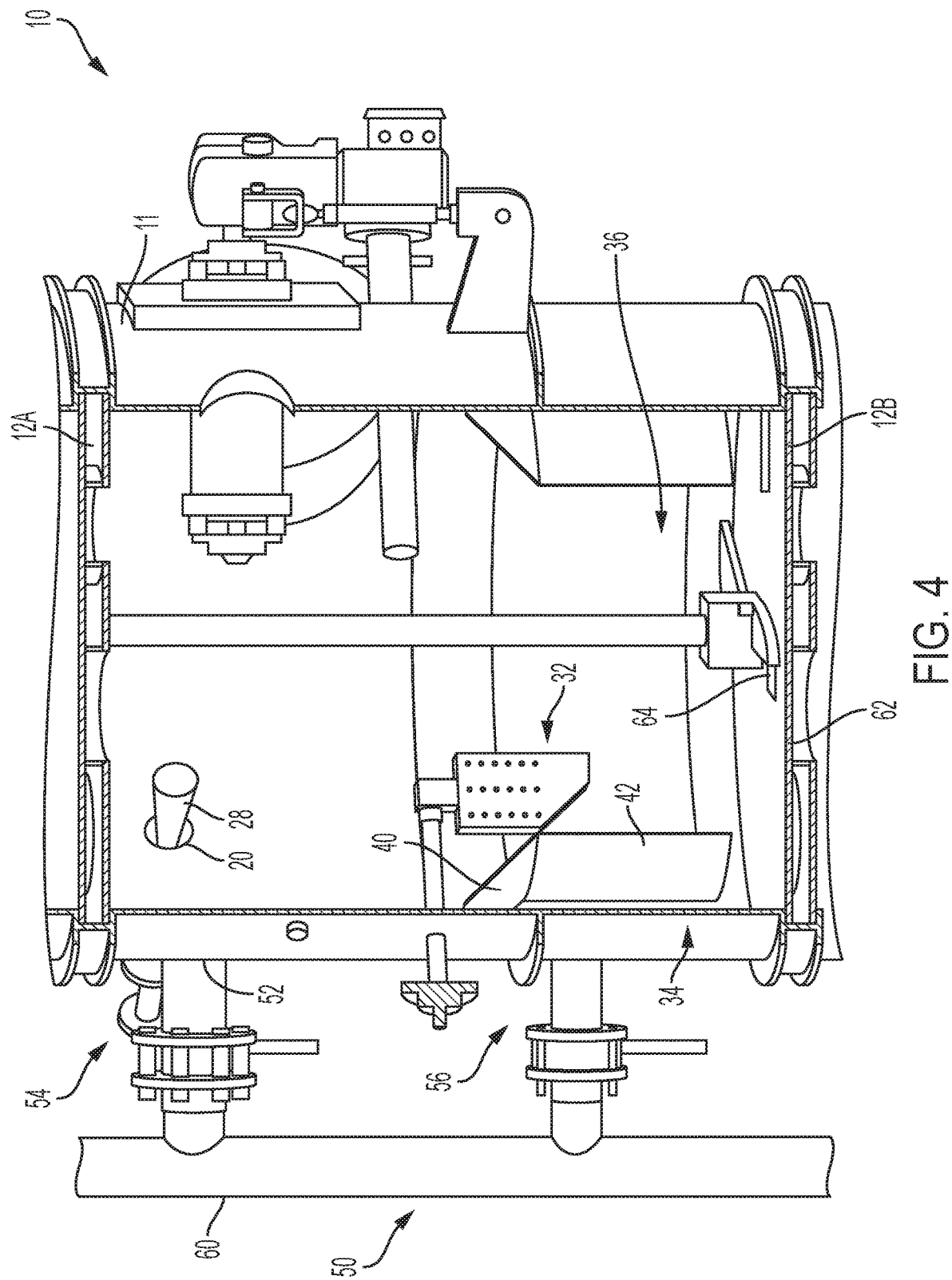
FIG. 4 is another sectional side view of a portion of the example desolventizer of FIGS. 1 and 2 illustrating an example arrangement of components.

To maintain a controlled pressure in the processing space between adjacent trays, desolventizer 10 may include one or more additional pressure control features. FIG. 4 is another sectional side view of a portion of desolventizer 10 illustrating an example arrangement of components. As shown in this image, desolventizer 10 may include a vent 50 that allows the processing space between adjacent trays to be pressure regulated. Vent 50 may have an inlet 52 located between adjacent trays and in fluid communication with the processing space between the trays. As pressure builds up inside of the processing space with the injection of recirculating and motive gas, vent 50 may be opened to remove gas from the processing space and control the pressure. Alternatively, rather than opening on an intermittent or periodic basis to relieve pressure, vent 50 may be open to continuously relieve pressure from the processing space.

In the illustrated configuration, each processing section is shown as having two vents: a first vent 54 in fluid communication with the inner space 36 defined by baffle 32 and a second vent 56 in fluid communication with the annular space 34 defined by baffle 32.

Accordingly, during operation when a level of solid material being processed is present to close the gap 46 between the two spaces (34, 36), each space can be separately vented to pressure equilibrate or otherwise pressure control the processing environment (e.g., at a desired pressure differential). While desolventizer 10 in FIG. 4 is illustrated as having two vents for each processing section, in other implementations, the desolventizer may have only a single vent for venting a processing space (e.g., having an inlet below top wall 42 of baffle 32 to access space 34 or above the top wall 42 to access space 36) or may not have a vent (e.g., allowing gas to vent internally by flowing between adjacent processing sections).

For example, in some configurations, it may be desirable to force all vapor above and within the bed of material on tray 12 to flow through the bed of material before being vented out vent 50. In these configurations, vent 50 may be positioned with an inlet below top wall 42 of baffle 32 to access space 34 (without having a vent opening that vents space 36 directly). The vent opening 50 may be radially offset from the ejector outlet 20 (e.g., from 90° to 180°) as discussed below to promote vapor mixing between gas being injected into the processing space via outlet 20 and taken back out of the space via vent 50.

One or more (e.g., optionally all) of vents 50 may be positioned radially offset from outlet 20 of recirculation loop 16. For example, one or more of vents 50 may be radially offset from 30° to 120°, such as from 45° to 90° from outlet 20 of recirculation loop 16. This can be useful to prevent gas being reinjected into the processing space from flowing right back out of the space via the vent.

Each vent may be independently controlled to control the pressure within a processing space. For example each vent may have a pressure regulator that opens when the pressure inside of the processing space being vented reaches a threshold pressure. The pressure regulator may open automatically or response to control signals from a system controller controlling the operation of desolventizer 10. Alternatively, one or more of the vents may be controlled by a manually actuatable valve that an operator controls the position of to control the pressure inside of the processing space being vented.

In the illustrated arrangement, all of the vent ports on the desolventizer are vented to a shared vent line 60. Vent line 60 may or may not be connected to a vacuum source to draw gas through the vent line. In either case, gas from the vent line 60 may be suitably processed, e.g., through condensation and recovery, combustion, and/or other suitable processing technique.

To maintain a controlled pressure environment within a space between adjacent trays, each tray 12 may be sealed to substantially pressure isolate one processing space from an adjacent processing space. Each tray 12 may have one or more outlets or discharge ports 62 through which solid material being processed moves through the tray for passing through desolventizer 10. The one or more discharge ports 62 can be located at any suitable location on the tray, for example, centered on the tray or offset to a side of the tray. A rotating sweep arm 64 positioned on or a small distance above the top surface of the tray can mechanically sweep solid material being processed around the processing space. The rotating sweep arm can provide both a mixing function to intermix the solid material being processed with gas to promote desolventizing as well as push solid material being processed from the opening of an upper tray to the outlet of the lower tray. For example, the rotating sweep arm 64 may have blades bend or angled to direct material being pushed by the rotating sweep arm toward an opening located at a center of the tray.

To control gas flow through the tray 12, each discharge ports 62 on the tray may be sealed with a valve that is configured to allow solid material being processed to flow through the valve but minimize the amount of gas that can flow with the solid material between adjacent processing spaces. For example, each discharge ports 62 may be closed with a rotary valve that has a plurality of vanes extending radially outwardly from an axis of rotation. As the valve rotates with a flow of solid material, the rotating vanes can limit the extent to which gas can flow between adjacent processing spaces, thereby substantially pressure isolating the processing spaces from each other. When so configured, tray 12 between adjacent processing spaces may be devoid of holes or apertures, e.g., such as those found on a sparge tray or other tray intended to allow gas communication through the thickness of the tray.

The specific pressures at which each recirculation loop 16 and corresponding processing space operates may vary based on a variety of factors, e.g., such as the characteristics of the material being processed in thermal performance of the desolventizer. In some examples, gas conveyance device 24 for a recirculation loop 16 is configured—for example, by sizing an ejector and/or controlling a motive gas 30—to draw a vacuum of at least 0.1 inches of $H_2O$, such as at least 0.5 inches of $H_2O$, or at least 3 inches of $H_2O$. The gas conveyance device 24 may inject the recirculating gas along with motive gas into the processing space between adjacent trays at a pressure that is controlled to achieve a target pressure drop across the bed of material being processed.

The operating pressure in a processing space between adjacent trays may be controlled, e.g., by controlling the amount of heating supplied in the processing space, the injection of motive gas, and the relief pressure of one or more vents. In some configurations, each vent 50 is configured to open at a threshold pressure greater than 0 inches of $H_2O$, such as a pressure greater than 2 inches of $H_2O$, or a pressure greater than 10 inches of $H_2O$. For example, vent 50 may open at a pressure ranging from 0 inches of $H_2O$ to 60 inches of $H_2O$, such as from 4 inches of $H_2O$ to 10 inches of $H_2O$.

Where each processing space between adjacent trays 12 is independently pressure controllable, a variety of different pressure profiles may be created over the length of desolventizer 10. In some examples, the operating pressure of the vapor space above each tray (e.g., the vapor space in each processing space) is varied between successive trays by a pressure of 1" $H_2O$ or more, such as from 3" $H_2O$ or more, or 5" $H_2O$ or more. Using different operating pressures for different processing spaces can promote solvent vaporization, thereby facilitating desolventizing and drying.

In some examples, the operating pressure of the vapor space above each tray is varied from 3" $H_2O$ to 30" $H_2O$, such as from 3" $H_2O$ to 15" $H_2O$. The pressure may be progressively increased between successive processing spaces (e.g., moving from the top of the housing to the bottom of the housing), progressively decreased between successive processing spaces, or have a variable pressure profile whereby pressure is increased and decreased between adjacent processing spaces at different points in the desolventizer.

In one configuration, for instance, the operating pressure in each adjacent processing space decreases moving from the top to the bottom of the vessel, such that the pressure in the processing space between adjacent trays at one level is greater than the pressure in the processing space between adjacent trays at a lower level. In another configuration, the operating pressure in different processing spaces across the length of desolventizer 10 may not be continuously increasing or decreasing but instead may be asymmetrical. For example, desolventizer 10 may operate with at least two upper processing spaces and two lower processing spaces. The two upper processing spaces may include one processing space that operates at a comparatively higher pressure and one lower processing space that operates at a comparatively lower pressure, thereby providing a desolventizing section. Below the desolventizing section, the two lower processing spaces may include one processing space that operates at a comparatively higher pressure and one lower processing space that operates at a comparatively lower pressure, thereby providing a drying section. As a result, the desolventizer can exhibit a pressure profile from a top of the housing to the bottom of the housing that includes, in sequence, a high pressure zone, a low pressure zone, a high pressure zone, and a low pressure zone. Additional pressure zones may or may not be present with the four noted pressure zones depending on the number of processing spaces provided in the desolventizer.

In one example, the operating pressure of each processing space increases from one operating space to the next moving from the top of desolventizer 10 to the bottom of the desolventizer. For example, the pressure of the vapor space above the tray in each processing space may increase from 5 inches of $H_2O$ (gauge pressure) to 30 inches of $H_2O$ (gauge pressure) between adjacent stages. In the example of a desolventizer that has four trays, for example, the vapor space above the first tray may operate at 0 inches of $H_2O$ (gauge pressure), the vapor space above the second tray may operate at 15 inches of $H_2O$ (gauge pressure), the vapor space above the third tray may operate at 30 inches of $H_2O$ (gauge pressure), and the vapor space above the fourth tray may operate at 60 inches of $H_2O$ (gauge pressure). The foregoing pressures are examples, and it should be appreciated that the disclosure is not limited in this respect.

In addition to or in lieu of configuring desolventizer 10 with multiple processing spaces of different pressure, the pressure within each processing space may be substantially constant during operation or may vary during operation. For example, the pressure within a given processing space may be actively adjusted (e.g., by raising and/or lowering the pressure) by controlling the recirculation loop (e.g., injection of motive gas and gas drawn from the annular space) and/or controlling venting from the processing space. In some examples, the pressure in at least one processing space of desolventizer 10 is adjusted by sequentially increasing and then decreasing the pressure in the processing space. The pressure may be adjusted (e.g., increased or decreased) by a pressure of 1" $H_2O$ or more, such as from 3" $H_2O$ or more, 5" $H_2O$ or more, or from 3" $H_2O$ to 10" $H_2O$. The pressure may be adjusted over a period of at least 10 seconds, such as 30 seconds or more, or a time period ranging from 15 seconds to 3 minutes, such as from 30 seconds to 2 minutes.

Figure 6:
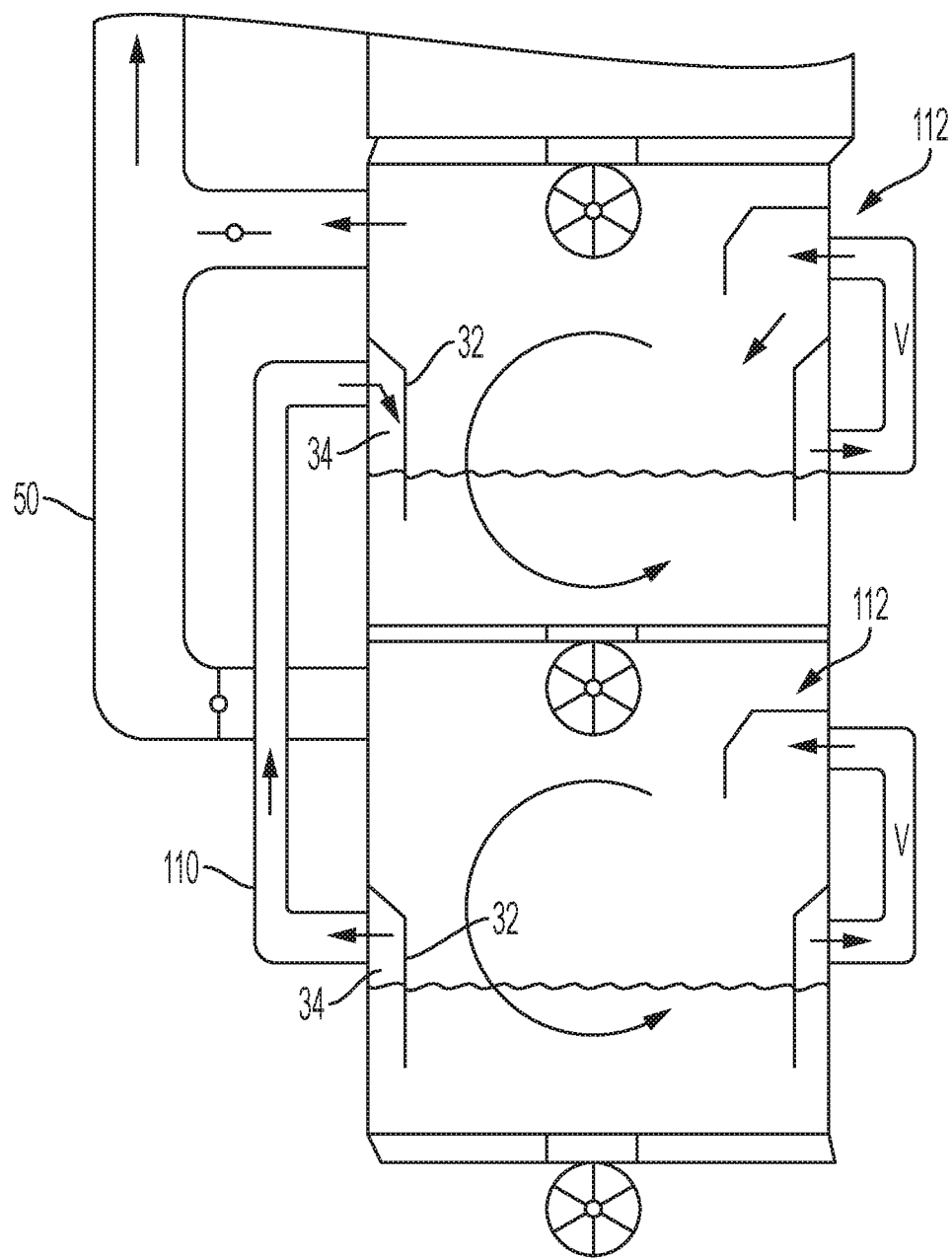
FIG. 6 is a partial sectional side view of a portion of an example desolventizer according to FIGS. 1-5 illustrating example features that may be implemented on the desolventizer.

A desolventizer according to the disclosure can have a variety of other features in addition to or in lieu of the features discussed above. FIG. 6 is a partial sectional side view of a portion of an example desolventizer according to FIGS. 1-5 illustrating example features that may be implemented on the desolventizer in addition to or in lieu of those discussed above. In this example, the desolventizer is illustrated as including at least one gas redistribution pipe 110 configured to transport gas from one processing space to a different processing space within the desolventizer vessel. In particular, the illustrated configuration of FIG. 6 shows gas redistribution pipe 110 positioned to draw gas from a lower processing space and to deliver the gas to an upper processing space, which may be an immediately adjacent processing space or may be separated by one or more intervening processing spaces.

Gas redistribution pipe 110 can have an inlet in fluid communication with an annular space 34 on the interior side of baffle 32 of one processing space and an outlet in fluid communication with an annular space 34 on the interior side of baffle 32 of a different processing space. One or both of the annular spaces from which gas is drawn into and/or discharged from gas redistribution pipe 110 may also be in fluid communication with a recirculation loop 16 that functions to recirculate gas within a processing space via a gas conveyance device. When so configured, the inlet and/or outlet of gas redistribution pipe 110 may be offset from the inlet of the gas recirculation loop, e.g., on a substantially opposite side about the perimeter of the vessel. Gas may flow through gas redistribution pipe 110 via a pressure differential between the processing spaces the gas redistribution pipe is in fluid communication with, e.g., without the aid of a gas conveyance device. A throttling valve or other flow control device may be implemented to control the flow of gas through gas redistribution pipe 110.

When desolventizer 10 is configured with a gas redistribution pipe, the desolventizer may have a single gas redistribution pipe 10 fluidly connecting one processing space to another processing space. Alternatively, the desolventizer may have multiple gas redistribution pipes fluidly connecting different processing spaces to each other. For example, desolventizer 10 may include a first gas redistribution pipe connecting a first (lower) processing space to a second (upper) processing space and a second gas redistribution pipe connecting a third (lower) processing space to a fourth (upper) processing space.

In addition to or in lieu of configuring desolventizer 10 with a gas redistribution pipe, the desolventizer may include a baffle 112 extending over the outlet 20 of the recirculation loop 16. Baffle 112 may include an upper lateral surface and a downwardly extending surface which, in combination, redirect gas flow discharging from the outlet of the recirculation loop downwardly into the processing space. This may help facilitate efficient gas circulation and exchange within the processing space, limiting the extent to which gas discharging from the recirculation loop flows directly into vent 50. Accordingly, baffle 112 may function to redirect flow discharging from the outlet of the recirculation loop away from vent 50.

A desolventizer with thermal recirculation loop according to the disclosure may desolventize solvent wet solid material more efficiently than a comparative desolventizer without thermal recirculation loop, reducing the energy requirements (e.g., steam consumption) needed to dry the material. While the performance characteristics of a specific desolventizer will vary depending on design and operating parameters, in some configurations, the desolventizer may receive a solid material having between 20 and 40 weight percent solvent and dry the material down to less than 1 weight percent solvent, such as less than 2000 ppm solvent, or less than 200 ppm solvent.

Various examples have been described. These and other examples are within the scope of the following claims.

The invention claimed is:

1. A method comprising:
   introducing a solvent-containing material into a housing containing a plurality of trays vertically spaced from one another to define a plurality of processing zones;
   heating the solvent-containing material in at least some of the plurality of processing zones through application of at least one indirect or direct heating and thereby vaporizing solvent from the solvent-containing material;

drawing gas from an annular space formed between a baffle and an inner wall of the housing within a select one of the plurality of processing zones, and reinjecting the gas via application of a motive gas to an ejector into a second space positioned on an opposite side of the baffle in the select one of the plurality of processing zones.

2. The method of claim 1, wherein introducing the solvent-containing material into the housing comprises forming a bed of the solvent-containing material on a tray within the select one of the plurality of processing zones deeper than a distance separating a bottom edge of the baffle from the tray, thereby requiring gas traveling from the second space to the annular space within the processing zone to pass through the bed of material.

3. The method of claim 1, wherein drawing gas from the annular space and reinjecting the gas into the second space comprises drawing gas from an inlet and reinjecting the gas through an outlet, the outlet being vertically elevated above the inlet.

4. The method of claim 1, further comprising venting gas from the select one of the plurality of processing zones via a vent line.

5. The method of claim 4, wherein venting gas comprises venting gas though a first vent opening in the annular space and a second vent opening in the second space.

6. The method of claim 5, wherein the first vent opening and the second vent opening are each radially offset from an outlet through which gas is reinjected into the second space.

7. The method of claim 1, wherein the motive gas is steam, and a tray within the select one of the plurality of processing zones is indirectly heated but not directly heated such that sparge steam is not injected through the tray.

8. The method of claim 1, wherein the solvent-containing material comprises a material selected from the group consisting of a soy material, a palm material, a corn material, a rapeseed material, and combinations thereof, and a solvent wetting the material is an organic solvent.

9. The method of claim 1, further comprising:

drawing gas from an second annular space formed between a second baffle and a second inner wall of the housing within a second select one of the plurality of processing zones, and reinjecting the gas via application of a motive gas to a second ejector into another second space positioned on an opposite side of the second baffle in the second select one of the plurality of processing zones.

* * * * *